United States Patent [19]

Shamie

[11] Patent Number: 5,622,376
[45] Date of Patent: Apr. 22, 1997

[54] STROLLER WITH FOLDING MECHANISM FOR COMPACT COLLAPSING ARRANGEMENT

[76] Inventor: Louis Shamie, 175 Liberty St., Brooklyn, N.Y. 11212

[21] Appl. No.: 395,416

[22] Filed: Feb. 27, 1995

[51] Int. Cl.[6] .................................................. B62B 7/06
[52] U.S. Cl. ........................... 280/642; 280/42; 280/650; 297/16.2; 297/46
[58] Field of Search ................................... 280/642, 644, 280/42, 647, 650, 47.38, 47.4; 297/16.2, 46, 48

[56] References Cited

U.S. PATENT DOCUMENTS

| | | | |
|---|---|---|---|
| 4,062,555 | 12/1977 | Peng et al. | 280/42 |
| 4,232,897 | 11/1980 | Maclaren et al. | |
| 4,386,790 | 6/1983 | Kassai | 280/42 X |
| 4,529,219 | 7/1985 | Shamie | |
| 4,645,370 | 2/1987 | Kassai | 280/42 X |
| 4,697,823 | 10/1987 | Kassai | 280/42 X |
| 4,743,043 | 5/1988 | Shamie | |
| 5,181,735 | 1/1993 | Onishi | |
| 5,288,098 | 2/1994 | Shamie | |
| 5,348,336 | 9/1994 | Fernie et al. | 280/42 X |
| 5,388,853 | 2/1995 | Lauro | 280/642 |
| 5,427,402 | 6/1995 | Huang | 280/650 X |
| 5,454,584 | 10/1995 | Haut et al. | 280/650 X |

Primary Examiner—Brian L. Johnson
Assistant Examiner—Michael Mar
Attorney, Agent, or Firm—Burgess, Ryan & Wayne

[57] ABSTRACT

A stroller includes a pair of side frames, each including a main side tube comprised of upper and lower tube portions pivotally mounted to each other, a rear side tube pivotally connected to the upper tube portion, and a support rod pivotally connected to the rear side tube and to the lower tube portion; a rear articulated spreader bar mechanism for connecting together the rear side tubes of the pair of side frames, the rear articulated spreader bar mechanism including a pair of rear pivoting spreader bars, each pivotally connected at one end thereof to a respective rear side tube and at an opposite end thereof to the other rear pivoting spreader bar; a front articulated spreader bar mechanism for connecting together the lower tube portions of the pair of side frames, the front articulated spreader bar mechanism including a pair of front pivoting spreader bars, each pivotally connected at one end thereof to a respective lower tube portion and at an opposite end thereof to the other front pivoting spreader bar; and actuating rods connected between the support rods and each of the rear articulated spreader bar mechanisms and the front articulated spreader bar means, such that folding of the upper tube portions relative to the lower tube portions in a lengthwise direction of the stroller causes articulation of the front and rear articulated spreader bar mechanisms which results in widthwise contraction of the stroller.

24 Claims, 4 Drawing Sheets

STROLLER WITH FOLDING MECHANISM FOR COMPACT COLLAPSING ARRANGEMENT

BACKGROUND OF THE INVENTION

The present invention relates generally to strollers, and more particularly, is directed to a stroller which folds into a compact arrangement.

Strollers are known which include a pair of spaced apart side frame halves connected to each other by rigid bars, each half having a main side tube and a rear side tube pivotally connected to the main side tube at an intermediate portion thereof. Each main side tube includes a lower tube portion that is pivotally mounted at its upper end to the lower end of an upper tube portion thereof by means of a conventional locking pivot assembly. The upper ends of the rear side tubes are pivotally connected to a lower section of the upper tube portions.

Hook shaped handles are fixed to the upper free ends of the upper tube portions. The free lower ends of the lower tube portions carry the front wheels of the stroller, while the free lower ends of the rear side tubes carry the rear wheels of the stroller.

Each locking pivot assembly locks a lower tube portion to an upper tube portion, and provides release thereof to allow the upper tube portion to pivot rearwardly with respect to the lower tube portion such that the handles fold over the rear wheels of the stroller.

The above arrangement is known, for example, from strollers sold by Century Products Co. under the mark "TRAVELITE" and those sold by Graco Products Co. under the mark "LITERIDER".

However, a problem with such strollers is that the width of the stroller remains constant at all times, that is, in the open configuration and the folded configuration. This is because the side frame halves are connected to each in the widthwise direction by rigid bars which define the width of the stroller. As a result, the stroller cannot be folded into a very compact configuration.

Although umbrella strollers are known which fold in the lengthwise and widthwise directions, the arrangement is not satisfactory. Specifically, with conventional umbrella strollers, there is a lower scissor frame that interconnects the lower ends of the lower tube portions of the main side tubes with the lower ends of the rear side tubes, at positions immediately above the front and rear wheels.

With such umbrella strollers, unlike the aforementioned arrangement, the upper tube portions pivot forwardly with respect to the lower tube portions such that the handles fold over the front wheels of the stroller, and the rear wheels are provided on the opposite side of the folded stroller. When the lower scissor frame folds inwardly in the widthwise direction of the stroller to reduce its widthwise dimension, it necessarily must increase its lengthwise direction. Thus, because of this lower scissor frame arrangement and because the wheels are on opposite sides of the stroller, the length of the folded stroller is much greater than that of the aforementioned stroller.

OBJECTS AND SUMMARY OF THE INVENTION

Accordingly, it is an object of the present invention to provide a stroller that overcomes the problems with the aforementioned prior art.

It is another object of the present invention to provide a stroller that folds into a very compact configuration.

It is still another object of the present invention to provide a stroller that folds in both the lengthwise and widthwise directions thereof.

It is yet another object of the present invention to provide a stroller that is compact in both the lengthwise and widthwise directions thereof in the folded configuration.

In accordance with an aspect of the present invention, a stroller includes a pair of side frames, each side frame including a main side tube comprised of an upper tube portion, and a lower tube portion pivotally mounted at an upper end thereof to a lower end of the upper tube portion, a rear side tube pivotally connected to the upper tube portion, and a support rod pivotally connected at one end thereof to the rear side tube and at an opposite end thereof to the lower tube portion; a rear articulated spreader bar means for connecting together the rear side tubes of the pair of side frames, the rear articulated spreader bar means including a pair of rear pivoting spreader bars, each pivotally connected at one end thereof to a respective rear side tube and at an opposite end thereof to the other rear pivoting spreader bar; actuating rod means connected between the side frames and the rear articulated spreader bar means, wherein folding of the upper tube portions relative to the lower tube portions in a lengthwise direction of the stroller causes articulation of the rear articulated spreader bar means which results in contraction of the stroller in a widthwise direction thereof.

Each side frame includes a releasable locking pivot assembly for pivotally connecting the lower end of the upper tube portion to the upper end of the lower tube portion, such that the upper tube portion folds rearwardly of the respective lower tube portion. Thus, with front wheels mounted to lower ends of the lower tube portions, rear wheels mounted to lower ends of the rear side tubes, and handles mounted to upper ends of the upper tube portions, the front and rear wheels and the handles are adjacent each other in a folded configuration of the stroller.

The actuating rod means is connected between the support rods and each of the rear articulated spreader bar means. Specifically, the actuating rod means includes a first actuating rod pivotally connected at one end thereof to the support rod of one side frame and pivotally connected at an opposite end thereof to one rear pivoting spreader bar, a second actuating rod pivotally connected at one end thereof to the support rod on the other side frame and pivotally connected at an opposite end thereof to the other the front pivoting spreader bar.

The rear articulated spreader bar means further includes another pair of rear pivoting spreader bars positioned above the one pair of rear pivoting spreader bars, each rear pivoting spreader bar of the other pair of rear pivoting spreader bars being pivotally connected at one end thereof to a respective rear side tube and at an opposite end thereof to the other rear pivoting spreader bar; and a connecting bar connected between the pivot connection of the rear pivoting spreader bars of the one pair of rear pivoting spreader bars and the pivot connection of the rear pivoting spreader bars of the other pair of rear pivoting spreader bars.

A scissor frame is connected between the rear pivoting spreader bars of both pairs of rear pivoting spreader bars.

An upper articulated spreader bar means connects together the upper tube portions of the pair of side frames, the upper articulated spreader bar means including a pair of upper pivoting spreader bars, each pivotally connected at one end thereof to a respective upper tube portion and at an opposite end thereof to the other upper pivoting spreader bar.

The stroller further includes a collapsible seat support structure connected between the pair of side frames. The collapsible seat support structure includes two rear support bars, each pivotally hinged at an outer end thereof to a respective support rod and extending horizontally inwardly of the stroller; two front support bars, each pivotally hinged at an outer end thereof to a respective support rod and extending horizontally inwardly of the stroller; and a connecting bar pivotally connected to inner ends of the rear and front support bars.

In accordance with another aspect of the present invention, a stroller includes a pair of side frames, each side frame including a main side tube comprised of an upper tube portion, and a lower tube portion pivotally mounted at an upper end thereof to a lower end of the upper tube portion, a rear side tube pivotally connected to the upper tube portion, and a support rod pivotally connected at one end thereof to the rear side tube and at an opposite end thereof to the lower tube portion; a rear articulated spreader bar means for connecting together the rear side tubes of the pair of side frames, the rear articulated spreader bar means including a pair of rear pivoting spreader bars, each pivotally connected at one end thereof to a respective rear side tube and at an opposite end thereof to the other rear pivoting spreader bar; a front articulated spreader bar means for connecting together the lower tube portions of the pair of side frames, the front articulated spreader bar means including a pair of front pivoting spreader bars, each pivotally connected at one end thereof to a respective lower tube portion and at an opposite end thereof to the other front pivoting spreader bar; and actuating rod means connected between the side frames and each of the rear articulated spreader bar means and the front articulated spreader bar means, wherein folding of the upper tube portions relative to the lower tube portions in a lengthwise direction of the stroller causes articulation of the rear articulated spreader bar means and the front articulated spreader bar means which results in contraction of the stroller in a widthwise direction thereof.

In addition, the actuating rod means further includes a third actuating rod pivotally connected at one end thereof to the support rod on the one side frame and pivotally connected at an opposite end thereof to one front pivoting spreader bar, and a fourth actuating rod pivotally connected at one end thereof to the support rod on the other side frame and pivotally connected at an opposite end thereof to the other front pivoting spreader bar.

The above and other objects, features and advantages of the invention will become readily apparent from the following detailed description thereof which is to be read in connection with the accompanying drawings.

DETAILED DESCRIPTION OF A PREFERRED EMBODIMENT

Figure 1:
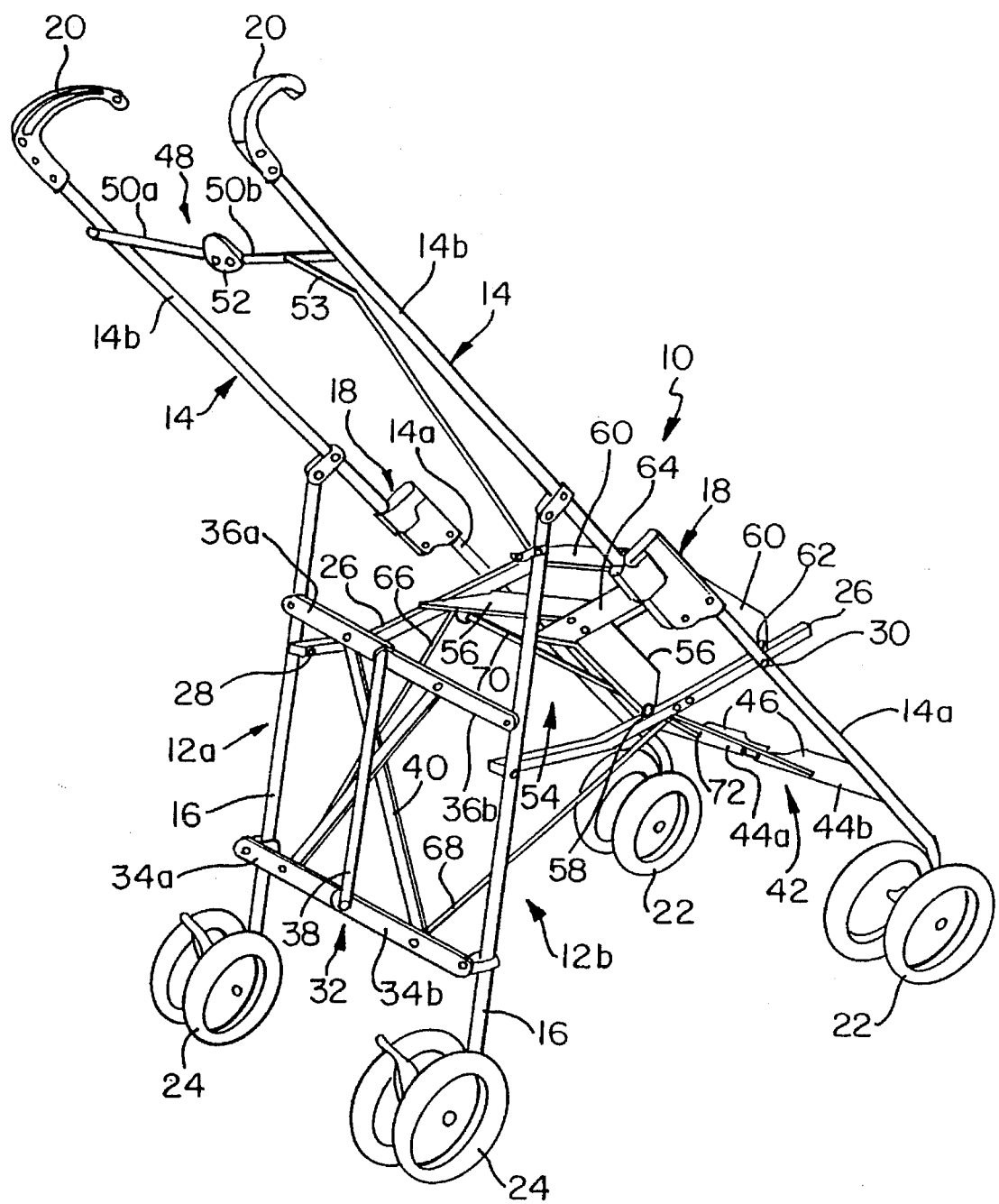
FIG. 1 is a perspective view of the frame of a stroller according to the present invention, in its fully opened configuration.

Referring to the drawings in detail, the present invention is directed to a stroller 10 including a pair of spaced apart side frame halves 12a and 12b, each having a main side tube 14 and a rear side tube 16 pivotally connected to main side tube 14 at an intermediate portion thereof.

Each main side tube 14 includes a lower tube portion 14a that is pivotally mounted at its upper end to the lower end of an upper tube portion 14b by means of a conventional locking pivot assembly 18. As shown, lower tube portion 14a and upper tube portion 14b are axially offset slightly from each other. The upper ends of rear side tubes 16 are pivotally connected to a lower section of upper tube portions 14b.

Hook shaped handles 20 are fixed to the upper free ends of upper tube portions 14b. The free lower ends of lower tube portions 14a carry the front wheels 22 of stroller 10, while the free lower ends of rear side tubes 16 carry the rear wheels 24 of stroller 10.

Figure 2:
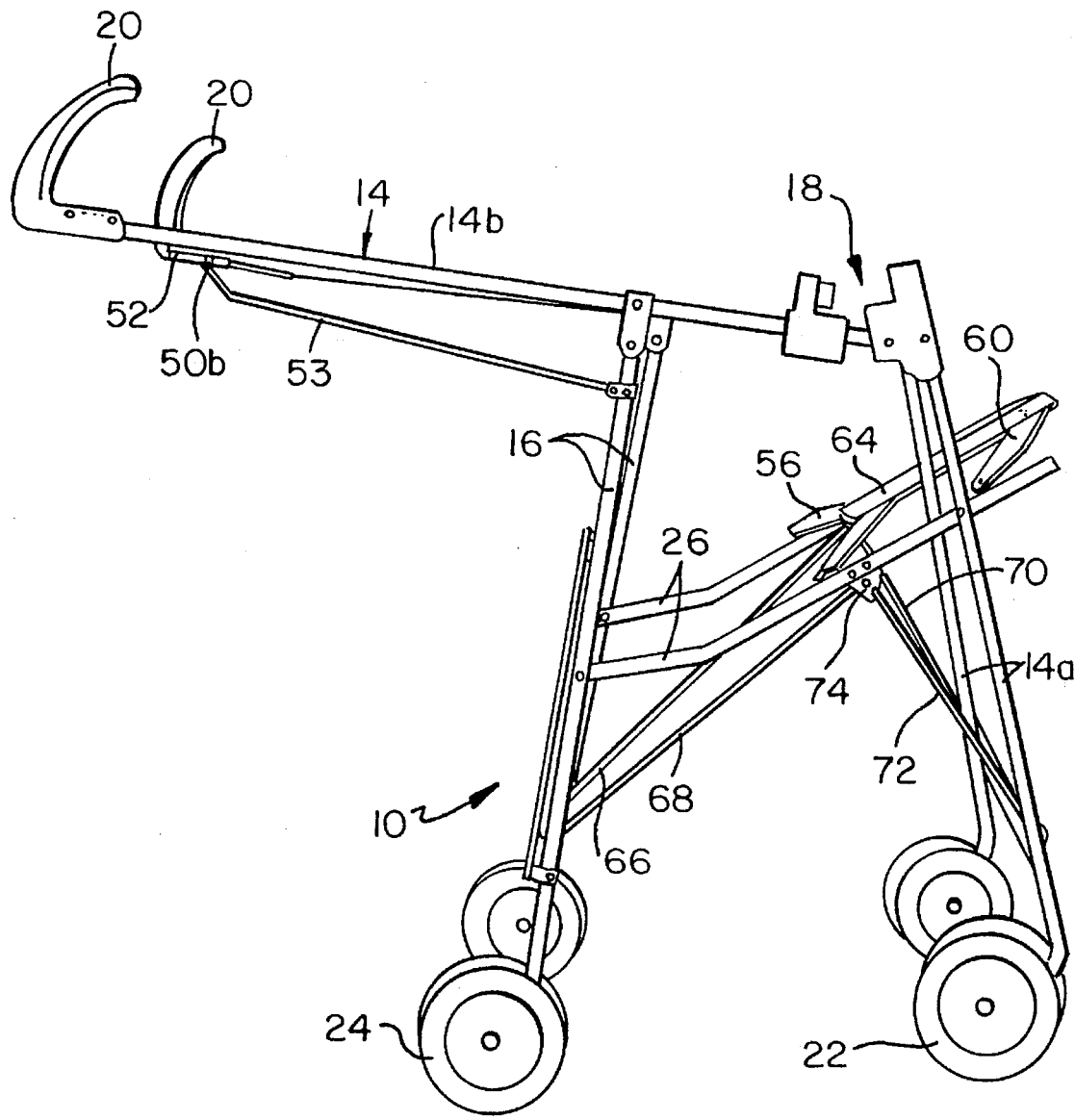
FIG. 2 is a perspective view of the frame of FIG. 1 in its partially closed configuration.
Figure 3:
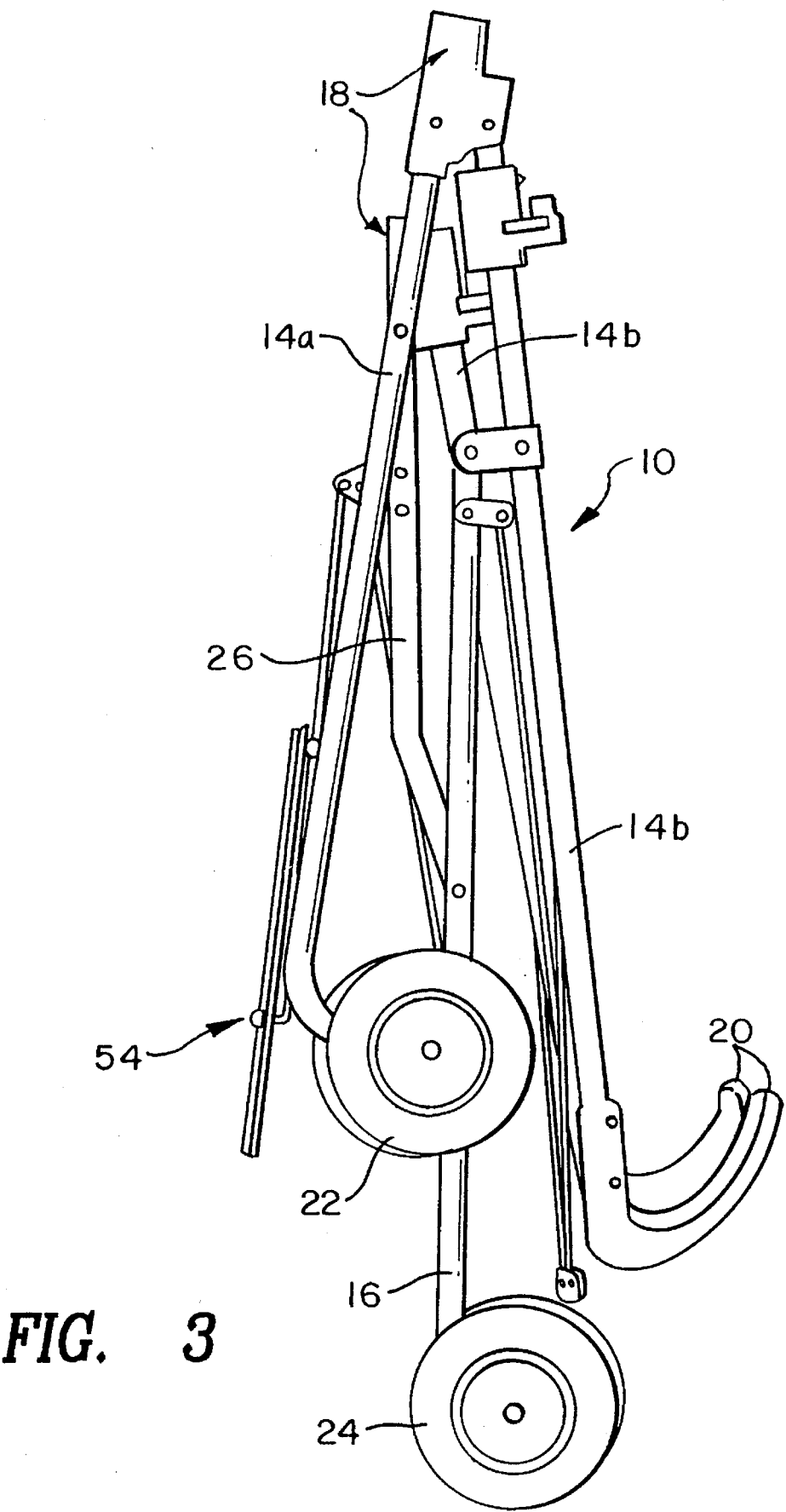
FIG. 3 is a perspective view of the frame of FIG. 1 in its fully closed configuration, viewed from the side thereof.
Figure 4:
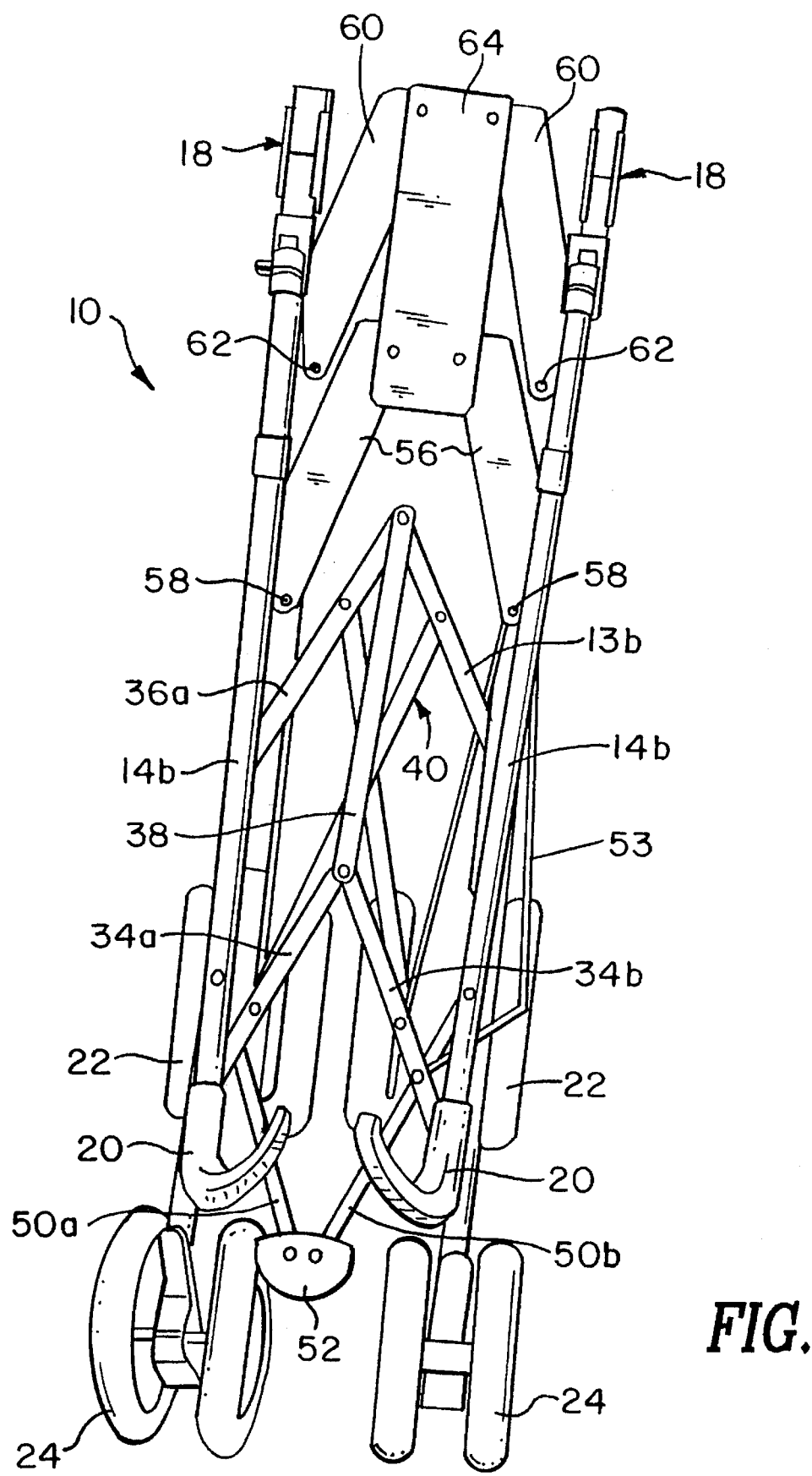
FIG. 4 is a perspective view of the frame of FIG. 1 in its fully closed configuration, viewed from the rear thereof.

Locking pivot assembly 18 locks lower tube portion 14a in parallel, slightly offset relation to upper tube portion 14b, and thereby locks stroller 10 in the open configuration shown in FIG. 1, while providing release thereof to allow upper tube portion 14b to pivot rearwardly with respect to lower tube portion 14a, and thereby fold stroller 10 as shown in FIGS. 2–4 such that handles 20 fold rearwardly over rear wheels 24 of stroller 10.

Two support rods 26 are pivotally connected by pivot pins 28 at their rear ends to substantially mid-points of rear side tubes 16 so as to be generally horizontally oriented in the open configuration of FIG. 1. In addition, each support rod 28 is pivotally secured to the respective lower tube portion 14a immediately below the respective locking pivot assembly 18 by pivot pins 30.

In order to connect the two side frame halves 14a and 14b together, a rear articulated spreader bar mechanism 32 is connected between rear side tubes 16 so as to hold side frame halves 14a and 14b apart in the open configuration of stroller 10 shown in FIG. 1. Rear articulated spreader bar mechanism 32 includes a lower pair of rear pivoting spreader bars 34a and 34b, each having one end pivotally connected to a lower portion of a respective rear side tube 16. The opposite centrally located ends of pivoting bars 34a and 34b are pivotally connected to each other.

Further, rear articulated spreader bar mechanism 32 includes an upper pair of pivoting spreader bars 36a and 36b, each having one end pivotally connected to a mid or upper portion of a respective rear side tube 16. The opposite centrally located ends of pivoting bars 36a and 36b are pivotally connected to each other. Pivoting bars 36a and 36b are positioned above pivoting bars 34a and 34b, and are parallel thereto. A vertically oriented connecting bar 38 is connected between the pivot connection of pivoting spreader bars 34a and 34b and the pivot connection of pivoting spreader bars 36a and 36b. As a result, when pivoting spreader bars 34a and 34b are pivoted with respect to each other, pivoting spreader bars 36a and 36b are also pivoted with respect to each other.

Further, an optional scissor frame 40 is connected between pivoting spreader bars 34a, 34b, 36a and 36b. Thus, the pair of lower pivoting spreader bars 34a and 34b can be pivoted with respect to each other at their pivoting connection, and the other pair of upper pivoting spreader bars 36a and 36b can be pivoted with respect to each other at their pivoting connection, for folding stroller 10 in the widthwise direction thereof. When pivoting spreader bars 34a, 34b, 36a and 36b are parallel to each other, as shown in FIG. 1, stroller 10 is in its open position. Since locking pivot assemblies 18 releasably lock stroller 10 in the open configuration of FIG. 1, a releasable locking mechanism for pivoting spreader bars 34a, 34b, 36a and 36b is unnecessary.

Stroller 10 further includes a front articulated spreader bar mechanism 42 connected between the lower ends of lower tube portions 14a of main side tubes 14. Front articulated spreader bar mechanism 72 includes a pair of front pivoting spreader bars 44a and 44b, each having one end pivotally connected to a lower portion of a respective lower tube portion 14a. The opposite centrally located ends of pivoting spreader bars 44a and 44b are pivotally connected to each other. Thus, pivoting spreader bars 44a and 44b can pivot between the parallel, aligned relation of the open configuration of FIG. 1 and the angled relation of the closed configuration of FIGS. 3 and 4. Each pivoting spreader bar 44a and 44b includes an extension 46 thereon which functions as a foot rest for a child.

Stroller 10 further includes an upper articulated spreader bar mechanism 48 connected between the upper ends of upper tube portions 14b of main side tubes 14, in order to hold the upper ends of side frame halves 12a and 12b apart in the open configuration of stroller 10 shown in FIG. 1. Upper articulated spreader bar mechanism 48 includes a pair of upper pivoting spreader bars 50a and 50b, each having one end pivotally connected to an upper portion of a respective upper tube portion 14b. The opposite centrally located ends of pivoting spreader bars 50a and 50b are pivotally connected to each other through the intermediary of a channel member 52. In addition, an actuating rod 53 is pivotally connected between bar 50b and one rear side tube 16 for opening spreader bars 50a and 50b upon folding of stroller 10.

A collapsible seat support structure 54 includes two rear support bars 56, each pivotally hinged at its outer end by a pivot pin 58 to an approximate mid-point of a horizontal support rod 26 and extending horizontally in a wing-like manner inwardly and forwardly of stroller 10 in the open configuration of stroller 10. Collapsible seat support structure 54 further includes two front support bars 60, each pivotally hinged at its outer end by a pivot pin 62 to a horizontal support rod 26 forwardly of the connection of horizontal support rod 26 to lower tube portion 14a, and extending horizontally in a wing-like manner inwardly and forwardly of stroller 10 in the open configuration of stroller 10. The inner ends of rear and front support bars 56 and 60 are pivotally connected to a connecting bar 64 that extends in the lengthwise direction of stroller 10.

A fabric (not shown) is stretched between horizontal support rods 26 so as to cover rear and front support bars 56 and 60 and connecting bar 64. Thus, the fabric is stretched to provide a seating area for an infant. A fabric (not shown) is also stretched between upper tube portions 14b to provide a back rest for the infant. A scissor frame (not shown) can also be provided between upper tube portions 14b for additionally supporting the fabric of the back rest.

With the arrangement thus far described, when locking pivot assemblies 18 are unlocked, upper tube portions 14b can be pivoted forwardly of lower tube portions 14a in the lengthwise direction of stroller 10. Thus, in the folded configuration of stroller 10, as shown in FIGS. 3 and 4, front wheels 22, rear wheels 24 and handles 20 are all on the same side of stroller 10.

At the same time, stroller 10 can be folded in the widthwise direction by pivoting spreader bars 34a and 34b, bars 36a and 36b, bars 44a and 44b and bars 50a and 50b relative to each other around the central pivot points thereof. This causes each pair of bars 56 and each pair of bars 60 to pivot relative to each other. As a result, stroller 10 can achieve a very compact folded condition.

In order to provide that stroller 10 automatically collapses in the widthwise direction when folding stroller 10 in the lengthwise direction thereof, actuating rods 66, 68, 70 and 72 are provided.

Specifically, actuating rod 66 is pivotally connected at one end to a triangular flange 74 hanging down from an approximate mid-point of horizontal support rod 26 of side frame half 12a, and is pivotally connected at the opposite end to lower pivoting spreader bar 34a at the pivot position thereof with scissor frame 40. Actuating rod 68 is pivotally connected at one end to a triangular flange 74 hanging down from an approximate mid-point of horizontal support rod 26 of side frame half 12b, and is pivotally connected at the opposite end to lower pivoting spreader bar 34b at the pivot position thereof with scissor frame 40.

Actuating rod 70 is pivotally connected at one end to triangular flange 74 on side frame half 12a, and is pivotally connected at the opposite end to a mid-point of front pivoting spreader bar 44a. Actuating rod 72 is pivotally connected at one end to triangular flange 74 on side frame half 12b, and is pivotally connected at the opposite end to a mid-point of front pivoting spreader bar 44b.

Thus, when folding stroller 10 in the lengthwise direction thereof, that is, about locking pivot assemblies 18, actuating rods 66, 68, 70 and 72, which are of a fixed length, cause the center pivot point of front pivoting spreader bars to pivot downwardly, and cause the center pivot point of lower pivoting spreader bars 34a and 34b to pivot upwardly. As a result, bars 34a and 34b, bars 36a and 36b, bars 44a and 44b and bars 50a and 50b pivot relative to each other around the central pivot points thereof, so that stroller 10 is automatically folded in the widthwise direction. As a result, stroller 10 can achieve a very compact folded condition.

Of course, it will be appreciated that various modifications may be effected within the scope of the invention. For example, it may be possible to eliminate actuating bars 70 and 72. Alternatively, actuating bars 68 and 72 may be eliminated.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention as defined by the appended claims.

What is claimed is:

1. A stroller comprising:
   a pair of side frames, each said side frame including:
   a main side tube comprised of:
   an upper tube portion, and
   a lower tube portion pivotally mounted at an upper end thereof to a lower end of said upper tube portion,
   a releasable locking pivot assembly for pivotally connecting a lower end of the upper tube portion to an upper end of the lower tube portion,
   a rear side tube pivotally connected to the upper tube portion, and
   a support rod pivotally connected at one end thereof to the rear side tube and at an opposite end thereof to the lower tube portion;

a rear articulated spreader bar means for connecting together said rear side tubes of said pair of side frames, said rear articulated spreader bar means including a pair of rear pivoting spreader bars, each pivotally connected at one end thereof to a respective said rear side tube and at an opposite end thereof to the other rear pivoting spreader bar; and actuating rod means pivotally connected between at least one said support rod and said rear articulated spreader bar means, whereby folding of said upper tube portions relative to said lower tube portions in a lengthwise direction of said stroller causes articulation of said rear articulated spreader bar means which results in contraction of said stroller in a widthwise direction thereof.

2. A stroller according to claim 1, wherein each said upper tube portion folds rearwardly of the respective lower tube portion.

3. A stroller according to claim 2, further comprising:

front wheels mounted to lower ends of said lower tube portions, rear wheels mounted to lower ends of said rear side tubes, and handles mounted to upper ends of said upper tube portions, and wherein said front and rear wheels and said handles are adjacent each other in a folded configuration of said stroller.

4. A stroller according to claim 1, wherein said actuating rod means includes a first actuating rod pivotally connected at one end thereof to the support rod of one said side frame and pivotally connected at an opposite end thereof to one said rear pivoting spreader bar.

5. A stroller according to claim 4, wherein said actuating rod means further includes a second actuating rod pivotally connected at one end thereof to the support rod on the other side frame and pivotally connected at an opposite end thereof to the other said rear pivoting spreader bar.

6. A stroller according to claim 1, wherein said rear articulated spreader bar means further includes:

another pair of rear pivoting spreader bars positioned above said one pair of rear pivoting spreader bars, each rear pivoting spreader bar of said another pair of rear pivoting spreader bars being pivotally connected at one end thereof to a respective said rear side tube and at an opposite end thereof to the other rear pivoting spreader bar; and a connecting bar connected between the pivot connection of the rear pivoting spreader bars of said one pair of rear pivoting spreader bars and the pivot connection of the rear pivoting spreader bars of said another pair of rear pivoting spreader bars.

7. A stroller according to claim 6, further comprising a scissor frame connected between said rear pivoting spreader bars of said one and said another pair of rear pivoting spreader bars.

8. A stroller according to claim 1, further including an upper articulated spreader bar means for connecting together said upper tube portions of said pair of side frames, said upper articulated spreader bar means including a pair of upper pivoting spreader bars, each pivotally connected at one end thereof to a respective said upper tube portion and at an opposite end thereof to the other upper pivoting spreader bar.

9. A stroller according to claim 8, further including an actuating rod connected between one said rear side tube and said upper articulated spreader bar means, whereby folding of said upper tube portions relative to said lower tube portions in a lengthwise direction of said stroller causes articulation of said upper articulated spreader bar means which results in contraction of said stroller in a widthwise direction thereof.

10. A stroller according to claim 1, further including a collapsible seat support structure connected between said pair of side frames.

11. A stroller according to claim 10, wherein said collapsible seat support structure includes:

two rear support bars, each pivotally hinged at an outer end thereof to a respective said support rod and extending horizontally inwardly of said stroller;

two front support bars, each pivotally hinged at an outer end thereof to a respective said support rod and extending horizontally inwardly of said stroller; and a connecting bar pivotally connected to inner ends of said rear and front support bars.

12. A stroller comprising:

a pair of side frames, each said side frame including:

a main side tube comprised of:

an upper tube portion, and a lower tube portion pivotally mounted at an upper end thereof to a lower end of said upper tube portion, a releasable locking pivot assembly for pivotally connecting the lower end of the upper tube portion to the upper end of the lower tube portion, a rear side tube pivotally connected to the upper tube portion, and a support rod pivotally connected at one end thereof to the rear side tube and at an opposite end thereof to the lower tube portion;

a rear articulated spreader bar means for connecting together said rear side tubes of said pair of side frames, said rear articulated spreader bar means including a pair of rear pivoting spreader bars, each pivotally connected at one end thereof to a respective said rear side tube and at an opposite end thereof to the other rear pivoting spreader bar;

a front articulated spreader bar means for connecting together said lower tube portions of said pair of side frames, said front articulated spreader bar means including a pair of front pivoting spreader bars, each pivotally connected at one end thereof to a respective said lower tube portion and at an opposite end thereof to the other front pivoting spreader bar;

first actuating rod means pivotally connected between at least one said support rod and said rear articulated spreader bar means; and second actuating rod means pivotally connected between at least one said support rod and said front articulated spreader bar means;

whereby folding of said upper tube portions relative to said lower tube portions in a lengthwise direction of said stroller causes articulation of said rear articulated spreader bar means and said front articulated spreader bar means which results in contraction of said stroller in a widthwise direction thereof.

13. A stroller according to claim 12, wherein each said upper tube portion folds rearwardly of the respective lower tube portion.

14. A stroller according to claim 13, further comprising:

front wheels mounted to lower ends of said lower tube portions, rear wheels mounted to lower ends of said rear side tubes, and handles mounted to upper ends of said upper tube portions, and wherein said front and rear wheels and said handles are adjacent each other in a folded configuration of said stroller.

15. A stroller according to claim 12, wherein said first actuating rod means includes a first actuating rod pivotally connected at one end thereof to the support rod of one said side frame and pivotally connected at an opposite end thereof to one said rear pivoting spreader bar.

16. A stroller according to claim 15, wherein said second actuating rod means further includes a second actuating rod pivotally connected at one end thereof to the support rod on said one side frame and pivotally connected at an opposite end thereof to one said front pivoting spreader bar.

17. A stroller according to claim 16, wherein said first actuating rod means further includes a third actuating rod pivotally connected at one end thereof to the support rod of the other said side frame and pivotally connected at an opposite end thereof to the other said rear pivoting spreader bar; and said second actuating rod means further includes a fourth actuating rod pivotally connected at one end thereof to the support rod on the other side frame and pivotally connected at an opposite end thereof to the other said front pivoting spreader bar.

18. A stroller according to claim 17, wherein said first and third actuating rods are connected to mid-points of said rear pivoting spreader bars, respectively, and said second and fourth actuating rods are connected to mid-points of said front pivoting spreader bars, respectively.

19. A stroller according to claim 12, wherein said rear articulated spreader bar means further includes:

another pair of rear pivoting spreader bars positioned above said one pair of rear pivoting spreader bars, each rear pivoting spreader bar of said another pair of rear pivoting spreader bars being pivotally connected at one end thereof to a respective said rear side tube and at an opposite end thereof to the other rear pivoting spreader bar; and a connecting bar connected between the pivot connection of the rear pivoting spreader bars of said one pair of rear pivoting spreader bars and the pivot connection of the rear pivoting spreader bars of said another pair of rear pivoting spreader bars.

20. A stroller according to claim 19, further comprising a scissor frame connected between said rear pivoting spreader bars of said one and said another pair of rear pivoting spreader bars.

21. A stroller according to claim 12, further including an upper articulated spreader bar means for connecting together said upper tube portions of said pair of side frames, said upper articulated spreader bar means including a pair of upper pivoting spreader bars, each pivotally connected at one end thereof to a respective said upper tube portion and at an opposite end thereof to the other upper pivoting spreader bar.

22. A stroller according to claim 21, further including an actuating rod connected between one said rear side tube and said upper articulated spreader bar means, whereby folding of said upper tube portions relative to said lower tube portions in a lengthwise direction of said stroller causes articulation of said upper articulated spreader bar means which results in contraction of said stroller in a widthwise direction thereof.

23. A stroller according to claim 12, further including a collapsible seat support structure connected between said pair of side frames.

24. A stroller according to claim 23, wherein said collapsible seat support structure includes:

two rear support bars, each pivotally hinged at an outer end thereof to a respective said support rod and extending horizontally inwardly of said stroller;

two front support bars, each pivotally hinged at an outer end thereof to a respective said support rod and extending horizontally inwardly of said stroller; and a connecting bar pivotally connected to inner ends of said rear and front support bars.

* * * * *